No. 845,357. PATENTED FEB. 26, 1907.
A. R. JACKSON.
APPARATUS FOR MAKING NUT BLANKS.
APPLICATION FILED NOV. 30, 1903.

2 SHEETS—SHEET 1.

WITNESSES
INVENTOR
A. R. Jackson

No. 845,357. PATENTED FEB. 26, 1907.
A. R. JACKSON.
APPARATUS FOR MAKING NUT BLANKS.
APPLICATION FILED NOV. 30, 1903.
2 SHEETS—SHEET 2.
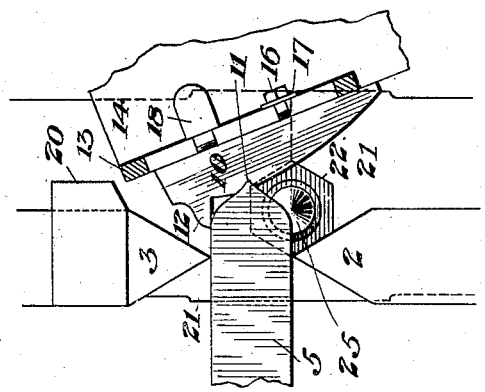
WITNESSES
INVENTOR

UNITED STATES PATENT OFFICE.

ANDREW R. JACKSON, OF AVALON, PENNSYLVANIA, ASSIGNOR OF ONE-HALF TO ALBERT GRAHAM, OF CRAFTON, PENNSYLVANIA.

APPARATUS FOR MAKING NUT-BLANKS.

No. 845,357.

Specification of Letters Patent.

Patented Feb. 26, 1907.

Application filed November 30, 1903. Serial No. 183,100.

*To all whom it may concern:*

Be it known that I, ANDREW R. JACKSON, of Avalon, Allegheny county, Pennsylvania, have invented a new and useful Improvement in Apparatus for Making Nut-Blanks, of which the following is a full, clear, and exact description, reference being had to the accompanying drawings, forming part of this specification, in which—

Figure 2:
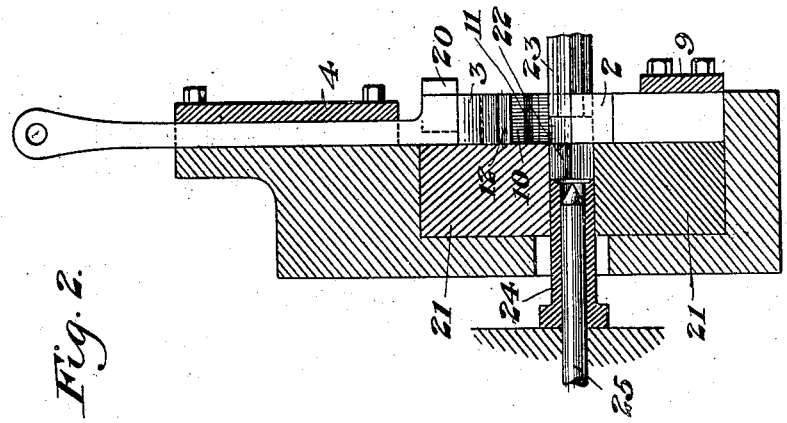
Figure 1:
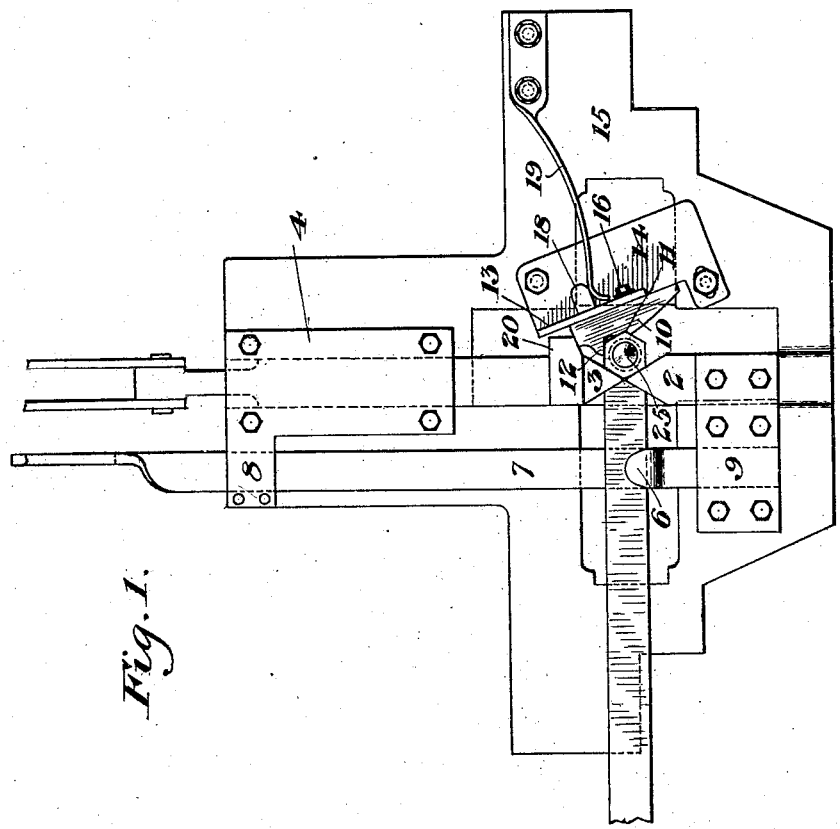

Figure 1 is a front elevation showing the box portion of a nut-machine constructed in accordance with my invention. Fig. 2 is a vertical central section of the same. Fig. 3 is a view similar to Fig. 1, showing another stage of the operation; and Fig. 4 is an enlarged detail view showing the position at the beginning of the shearing operation.

My invention relates to the manufacture of nut-blanks, and is designed to provide a rapid and effective system which shall be economical of the material and reduce the amount of scrap.

In the drawings, 2 represents a stationary lower shear-blade having an angular or diamond-shaped cutting-point, and 3 is an upper reciprocating shear-blade having a similar point and movable within a guide 4.

5 is the lower bar of steel or iron from which the nut-blanks are cut, and this bar is supported by a lug 6, projecting laterally from a reciprocating hanger 7, which is lifted by the upward movement of the shear-blade or cutter and moves in guides 8 and 9. When the bar 5 is shoved forward into place between the shear-blades or cutters, its front end engages the adjustable stop 10, having a front notch 11 to receive the point of the bar formed by the previous cutting operation and an overhanging shoulder 12, arranged to fit over the upper edge of the bar. The stop 10 is arranged to slide over the inclined flange 13 of an adjustable bracket 14, secured to the frame 15 of the machine, and is loosely connected with said flange by a bolt 16, having a washer or plate 17 fitting the rear face of the flange at the sides of the vertical slot through which the bolt extends. The stop is also provided with an upper lug 18, which is engaged by a leaf-spring 19 on the frame, serving to normally hold the stop in elevated position.

At the beginning of the cutting operation the parts are in the position shown in Fig. 3, and as the upper knife or cutter is forced down the bar 5 moves down with it, and the upper shear forces the bar over the lower shear until the parts assume the position shown in Fig. 1. During this severing action the bar moves down as a whole and its end portion is cut roughly to the hexagonal shape of the nut. During the downward movement of the cutter a projection 20 on the upper cutter engages the upper end of the stop as the cutter enters the metal and forces the stop downwardly as the metal moves down. The stop serves as a gage for the metal bar and also as a movable abutment which holds the metal back against the shears during its flow under the cutting operation. The shaping-die 21 (shown in Fig. 2) is set at the rear of the cutters, the upper of which slides over its front face, with its cavity 22 arranged to register with the blank at the end of the cutting operation. As the cutter reaches the end of its stroke a hollow reciprocating pusher 23, having the same axis as the blank, is forced forwardly and drives the blank endwise into the die-cavity. The rear wall of this cavity is formed of a hollow ejector 24, within which slides the reciprocating punch 25. The front end of the ejector is shaped to give the desired face to the nut as it is forced into the die-cavity, and the punch is then moved forwardly to cut the central portion of the blank and push the cut plug into the hollow pusher 23. After the blank is thus formed it is ejected by moving the ejector 24 forwardly, the blank dropping down at the front of the apparatus. As the upper shear-blade rises the hanger 7 carries up the blank-bar 5 with its angular front end, the operator pushes it forward to engage the stop, and the cycle of operations is repeated.

My improvement is preferably applied to a machine of the general type shown in Patent 155,638, granted to Charles and McKain on October 6, 1874.

The advantages of my invention result, first, from the use of a stationary and movable shear-blade with angular cutting ends adapted to roughly shape the sides of the nut. I have found in practice that two movable shear-blades of this character will not act properly, while the use of one stationary and one movable blade enables the metal to flow properly during the cutting. The movable stop holds the metal during the cutting and also acts as a gage for the forward movement of the bar.

The operation may be carried out rapidly, and as there is no cutting of V-shaped pieces from the blank the loss in scrap is greatly reduced.

Many variations may be made in the form of the nut, the arrangement of the cutting-blades, stop, dies, &c., without departing from my invention.

I claim—

1. An apparatus for forming nut-blanks, comprising a pair of cutters, and a stop for the blank-bar movable laterally with the blank to hold the same as it is cut from the bar.

2. An apparatus for forming nut-blanks, comprising a pair of substantially V-shaped cutters, an end stop for the blank-bar movable in the plane of the cutters, and means for causing said stop to move obliquely with the blank as it is cut from the bar.

3. An apparatus for forming nut-blanks comprising substantially V-shaped fixed and movable cutters, and a support for the blank-bar movable with the bar while the blank is being cut therefrom.

4. An apparatus for forming nut-blanks, comprising substantially V-shaped fixed and movable cutters, a support for the blank-bar movable therewith, and an end stop for the blank-bar movable with the blank in the plane of the cutters while the blank is being cut from the bar.

5. An apparatus for forming nut-blanks comprising a substantially V-shaped stationary cutter, a movable substantially V-shaped cutter coacting therewith to sever the blank from the blank-bar, and means coöperating therewith for moving the blank obliquely over the stationary cutter.

6. An apparatus for forming nut-blanks, comprising a stationary cutter, a movable cutter coacting therewith to sever the blank from the blank-bar, means for forcing the blank obliquely as it is severed from the bar, a forming-die box in alinement with the severed blank, and means for forcing the blank into the die-box.

In testimony whereof I have hereunto set my hand.

ANDREW R. JACKSON.

Witnesses:
ALBERT GRAHAM,
H. M. CORWIN.